May 5, 1925.
L. ROUANET
LOCKING DEVICE FOR REMOVABLE WHEELS
Filed April 11, 1922
1,536,456
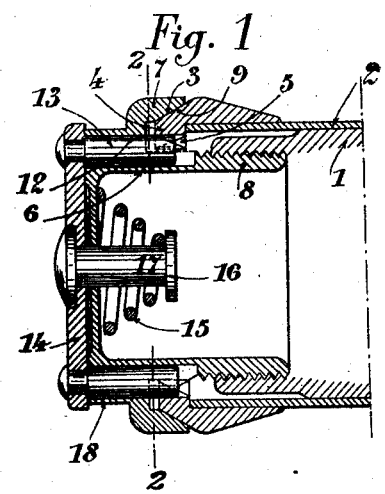
Fig. 1
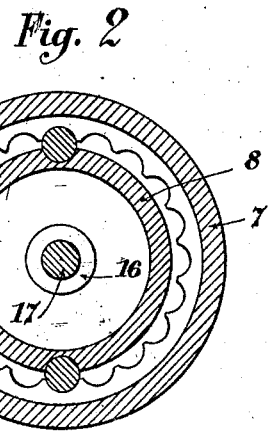
Fig. 2
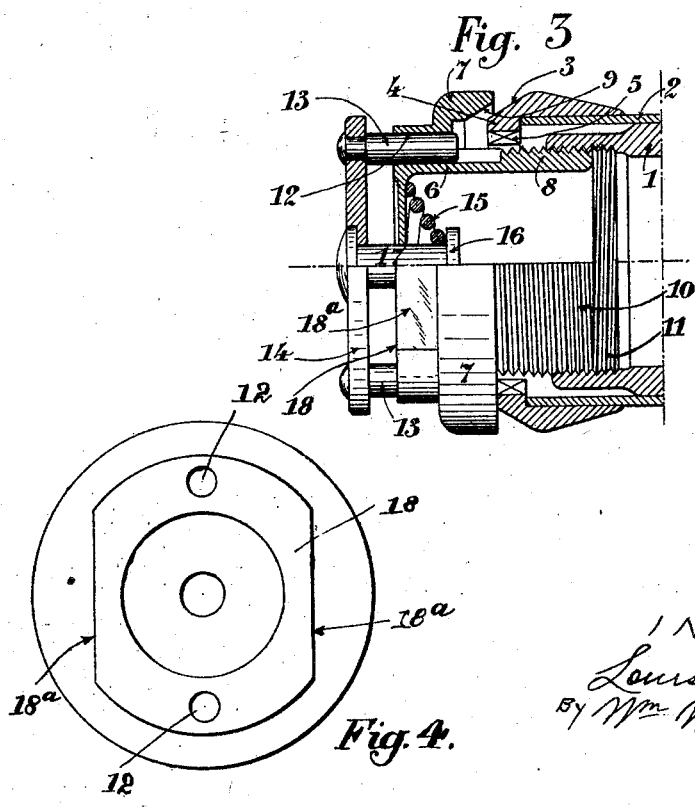
Fig. 3
Fig. 4.
INVENTOR:
Louis Rouanet.
By Wm Wallace White
ATTY.

Patented May 5, 1925.

1,536,456

UNITED STATES PATENT OFFICE.

LOUIS ROUANET, OF IVRY-PORT, FRANCE, ASSIGNOR TO COMPAGNIE D'APPLICATIONS MECANIQUES, OF PARIS, FRANCE.

LOCKING DEVICE FOR REMOVABLE WHEELS.

Application filed April 11, 1922. Serial No. 551,680.

*To all whom it may concern:*

Be it known that I, LOUIS ROUANET, citizen of the French Republic, residing at Ivry-Port, Seine, in the Republic of France, have invented new and useful Improvements in Locking Devices for Removable Wheels, of which the following is a specification.

The invention has for its object a locking device for removable wheels of the type in which an outer removable hub is mounted upon an inner permanent hub, the two hubs being adapted to rotate as a whole. In this type of wheel the outer hub is secured to the inner hub by means of a central nut.

One of the principal characteristics of the invention resides in that the nut is locked in position by means of fingers or studs which slide in bores provided in the nut in a direction parallel to the axis thereof and are yieldingly forced into notches formed in a flange on the removable hub.

This arrangement affords a great rigidity and obviates the drawbacks usually produced by the efforts tending to bend the locking elements in known locking devices comprising cooperating fingers and notches, the solidity of the locking is affected owing to a wear of said fingers and notches. On the other hand, if an effort is unduly exerted on the nut, the various members being in a nearly unlocked position, the fingers escape the notches or are injured and the teeth between the notches may be torn off one after the other. According to the invention, the fingers are guided along their whole length in the nut and afford a very solid locking as each one has its inner end engaged partly in the nut and partly in a notch.

The invention will be more clearly understood by referring to the accompanying drawing which is given by way of example and wherein:

Fig. 1 is an axial section of the present locking device in the locking position.

Fig. 2 is a cross section on the line 2—2 of Fig. 1.

Fig. 3 is a view similar to Fig. 1, the device being in the unlocked position.

Fig. 4 is a front elevation of the locking nut.

1 is the inner hub permanently secured on the axle not shown. 2 represents the external removable hub having at its front end a male conical portion and an inwardly extending flange 4 provided with semicircular notches 5.

The central nut 6 is provided with two annular concentric portions 7 and 8. In the portion 7 is formed the female conical part 9 corresponding to the part 3 of the external hub 2, whilst upon the part 8 is formed the screw-thread 10 which screws upon the corresponding threaded end 11 of the internal hub 1.

The nut 6 is provided with a certain number of bores 12 parallel to the axis of the wheel (in the example given the bores are two in number) wherein are slidable the fingers 13 secured to a disc 14 disposed at the front part of the nut 6. The disc 14 is constantly pressed against the nut 6 by means of a spring 15 bearing upon a collar 16 of a central stud 17 attached to the disc 14.

The nut 6 (see Fig. 4) has a front part 18 and lateral flat sides 18$^a$ for receiving a wrench with corresponding flat parts; said wrench when placed in position is adapted to separate the disc 14 from the nut 6 in order to disengage the fingers 13 from the notches 5 as shown in Fig. 3.

In Fig. 2, it is observed that, in the locking position, the inner end of the fingers 13 are placed half within the bores 12 and half in the notches 5, which gives a great rigidity to the construction and obviates all flexion which might be prejudicial to the good working.

Having now described my invention, what I claim as new and desire to secure by Letters Patent is:

In a removable wheel of the type comprising an outer hub adapted to be removably secured on an inner permanent hub, a locking device comprising a central nut screwed on the inner hub and adapted to secure the outer hub on the inner hub, notches provided in the periphery of said outer hub, locking pins adapted to slide in bores provided in said central nut in a direction parallel with the axis thereof and adapted to engage said notches, a disc upon which the said pins are mounted at diametrically opposite points, a central stud secured on said disc and extending through the nut, an abutment on said central stud and a spring seated on the nut and in engagement with said abutment tending to hold the pins in locking position in such manner that they are supported and guided throughout their length by the nut, their inner ends being engaged with the nut and also with said notches.

In testimony whereof I have signed my name to this specification.

LOUIS ROUANET.